United States Patent
Kenmochi et al.

(10) Patent No.: US 10,293,754 B2
(45) Date of Patent: May 21, 2019

(54) MIRROR DEVICE FOR VEHICLE

(71) Applicant: KABUSHIKI KAISHA HONDA LOCK, Miyazaki-shi, Miyazaki (JP)

(72) Inventors: Kenji Kenmochi, Miyazaki (JP); Takehito Yamashita, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 29 days.

(21) Appl. No.: 14/905,081

(22) PCT Filed: May 21, 2014

(86) PCT No.: PCT/JP2014/063455
§ 371 (c)(1),
(2) Date: Jan. 14, 2016

(87) PCT Pub. No.: WO2015/008535
PCT Pub. Date: Jan. 22, 2015

(65) Prior Publication Data
US 2016/0159285 A1    Jun. 9, 2016

(30) Foreign Application Priority Data

Jul. 17, 2013 (JP) ................................. 2013-148439

(51) Int. Cl.
*B60R 1/062* (2006.01)
*B60R 1/072* (2006.01)
*G02B 7/182* (2006.01)

(52) U.S. Cl.
CPC .............. *B60R 1/062* (2013.01); *B60R 1/072* (2013.01); *G02B 7/182* (2013.01)

(58) Field of Classification Search
CPC  B60R 1/0617; B60R 1/02; B60R 1/06; B60R 1/062; B60R 1/064; B60R 1/072; B60R 1/066; G02B 7/182

(Continued)

(56) References Cited

U.S. PATENT DOCUMENTS 4,101,205 A    7/1978  Bos
9,238,436 B2   1/2016  Chino et al.
(Continued)

FOREIGN PATENT DOCUMENTS

CN      102548802 A    7/2012
EP        1300289 A2   4/2003
(Continued)

OTHER PUBLICATIONS

Official Communication dated Sep. 29, 2016 for corresponding Chinese Application No. 201480039930.6.
(Continued)

*Primary Examiner* — Stephone B Allen
*Assistant Examiner* — Rahman Abdur
(74) *Attorney, Agent, or Firm* — Carrier Blackman & Associates, P.C.; Joseph P. Carrier; Jingli Wang (57) ABSTRACT

A mirror device for a vehicle is provided in which a support member is housed and fixed within a housing supported on a vehicle, a mirror disposed in the housing is held by a mirror holder, a joint having a spherical portion is projectingly provided on the support member, a hollow hemispherical fitting and supporting part having the spherical portion fitted thereinto is provided on the mirror holder, and a ring-shaped spring for maintaining the fitted state of the spherical portion within the fitting and supporting part is fitted around the fitting and supporting part. An engagement part that engages with the spring so as to prevent the spring from disengaging from the fitting and supporting part is formed integrally with the mirror holder while being capable of flexing so as to allow the spring to be fitted onto the fitting and supporting part.

12 Claims, 5 Drawing Sheets

(58) Field of Classification Search
USPC .......................................... 359/876, 872, 871
See application file for complete search history.

(56) References Cited

U.S. PATENT DOCUMENTS

| | | | |
|---|---|---|---|
| 2003/0086189 A1* | 5/2003 | Tsuyama | B60R 1/06 359/872 |
| 2004/0125476 A1 | 7/2004 | Boddy et al. | |
| 2011/0194202 A1* | 8/2011 | Kudo | B60R 1/072 359/873 |
| 2012/0170146 A1* | 7/2012 | Chino | B60R 1/072 359/872 |
| 2012/0218657 A1* | 8/2012 | Chino | B60R 1/072 359/876 |

FOREIGN PATENT DOCUMENTS

| | | |
|---|---|---|
| GB | 1510754 A | 5/1978 |
| JP | S58-78242 U | 5/1983 |
| JP | S60-76801 U | 5/1985 |
| JP | 2000-159174 A | 6/2000 |
| JP | 2010-235110 A | 10/2010 |

OTHER PUBLICATIONS

The extended European search report dated Feb. 22, 2017 issued in the corresponding EP 14826284.3.

* cited by examiner

MIRROR DEVICE FOR VEHICLE

TECHNICAL FIELD

The present invention relates to a mirror device for a vehicle, such as a door mirror or a rearview mirror of a four-wheeled automobile or a rearview mirror of a two-wheeled motor vehicle and, in particular, relates to a mirror device for a vehicle in which a support member is housed and fixed within a housing supported on a vehicle, a mirror disposed in an opening of the housing is held by a mirror holder made of a synthetic resin, a joint having a spherical portion in an extremity part thereof is projectingly provided on the support member, a hollow hemispherical fitting and supporting part having the spherical portion fitted thereinto is provided on the mirror holder, and a ring-shaped spring for maintaining the fitted state of the spherical portion within the fitting and supporting part is fitted around an outer periphery of the fitting and supporting part.

BACKGROUND ART

A mirror device for a vehicle in which a ring-shaped spring is fitted around the outer periphery of a fitting and supporting part provided on a mirror holder so that a spherical part of a joint on a housing side is fitted thereinto, and an engagement claw that engages with the spring in order to prevent the spring from coming off is projectingly provided integrally with the outer periphery of the fitting and supporting part is disclosed in Patent Document 1.

RELATED ART DOCUMENTS

Patent Documents
Patent Document 1: Japanese Patent Application Laid-open No. 2010-235110

SUMMARY OF THE INVENTION

Problems to be Solved by the Invention

However, in the arrangement disclosed in Patent Document 1 above, since a plurality of engagement claws are formed integrally with the outer periphery of the fitting and supporting part, when the spring is assembled on the outer periphery of the fitting and supporting part, it is necessary to assemble the spring by expanding it against its urging force when the spring surmounts the engagement claw, the load for assembling the spring is large, and the ease of assembly is degraded. Because of this, reducing the amount of engagement claw that protrudes could be considered, but by so doing the possibility of the spring coming off increases.

The present invention has been accomplished in light of such circumstances, and it is an object thereof to provide a mirror device for a vehicle that reduces the load for assembling a spring and enhances the ease of assembly.

Means for Solving the Problems

In order to attain the above object, according to a first aspect of the present invention, there is provided a mirror device for a vehicle in which a support member is housed and fixed within a housing supported on a vehicle, a mirror disposed in an opening of the housing is held by a mirror holder made of a synthetic resin, a joint having a spherical portion in an extremity part thereof is projectingly provided on the support member, a hollow hemispherical fitting and supporting part having the spherical portion fitted thereinto is provided on the mirror holder, and a ring-shaped spring for maintaining the fitted state of the spherical portion within the fitting and supporting part is fitted around an outer periphery of the fitting and supporting part, characterized in that an engagement part that engages with the spring so as to prevent the spring from disengaging from the fitting and supporting part is formed integrally with the mirror holder at a plurality of locations around the fitting and supporting part while being capable of flexing so as to allow the spring to be fitted onto the fitting and supporting part.

Further, according to a second aspect of the present invention, in addition to the first aspect, the fitting and supporting part is formed by annularly aligning a plurality of side wall parts having an inner face with an arc-shaped vertical section so that the side wall parts project from the mirror holder while forming slits therebetween.

Moreover, according to a third aspect of the present invention, in addition to the second aspect, the side wall part is formed in an inclined manner so as to be positioned further inward in going toward an extremity side in a natural state in which the spherical portion is not fitted.

Effects of the Invention

In accordance with the first aspect of the present invention, since the engagement part, which is capable of flexing so as to allow the spring to be fitted onto the fitting and supporting part, is formed integrally with the mirror holder at a plurality of locations around the fitting and supporting part, it is unnecessary to forcibly expand the spring when fitting the spring around the outer periphery of the fitting and supporting part, thus minimizing the assembly load and enhancing the ease of assembly.

Furthermore, in accordance with the second aspect of the present invention, since the fitting and supporting part is formed by annularly aligning the plurality of side wall parts forming slits therebetween, when assembling the spring the fitting and supporting part easily flexes in the radially inward direction, thus further enhancing the ease of assembly. Moreover, due to the spherical portion in an extremity part of the joint being fitted thereinto, the fitting and supporting part expands in the radially outward direction, thus strengthening the assembly of the spring with the fitting and supporting part and more reliably preventing the spring from coming off.

Moreover, in accordance with the third aspect of the present invention, since in the natural state in which no external force is applied to the fitting and supporting part each side wall part of the fitting and supporting part is inclined so as to be positioned further inward in going toward the extremity side, the operation of fitting the spring onto the fitting and supporting part from the extremity side thereof becomes easy, thus further enhancing the ease of assembly.

EXPLANATION OF REFERENCE NUMERALS AND SYMBOLS

13 Housing
16 Mirror
17 Mirror holder
19 Case member, which is support member
20 Joint
20a Spherical portion
21 Fitting and supporting part
22 Spring
33 Engagement part
34 Side wall part
35 Slit

MODE FOR CARRYING OUT THE INVENTION

An embodiment of the present invention is explained below by reference to the attached drawings.

First Embodiment

Figure 1:
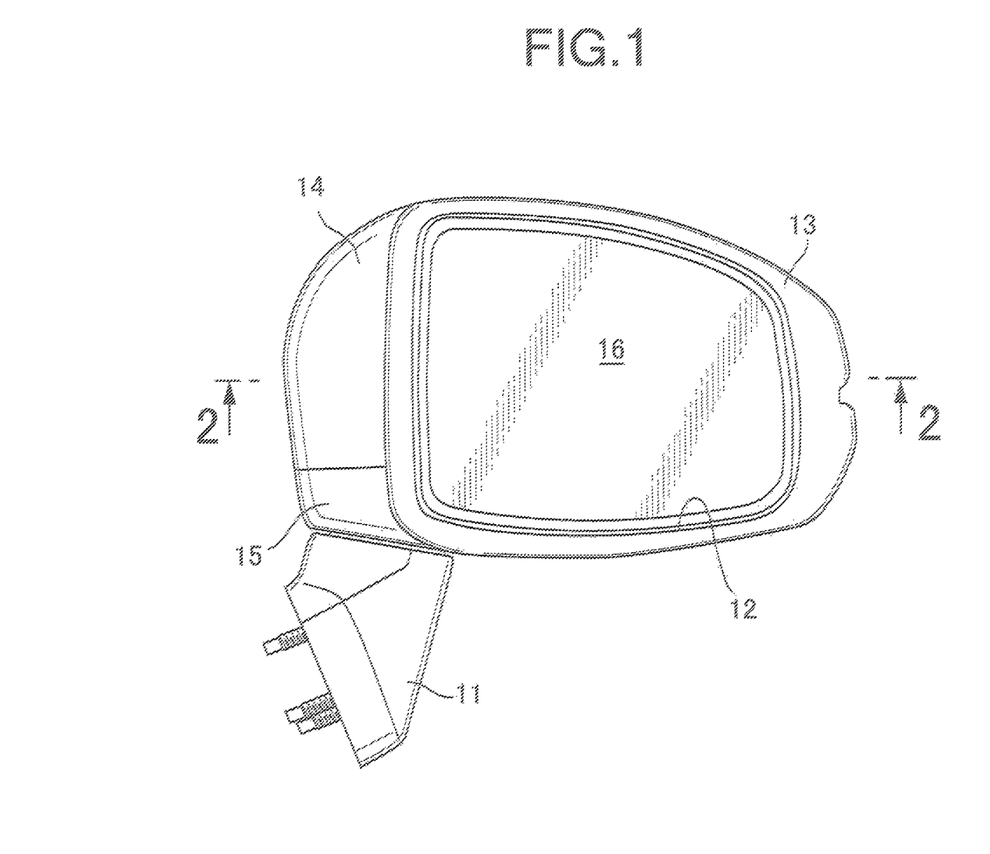
FIG. 1 is a front view of a door mirror for a vehicle. (first embodiment)
Figure 2:
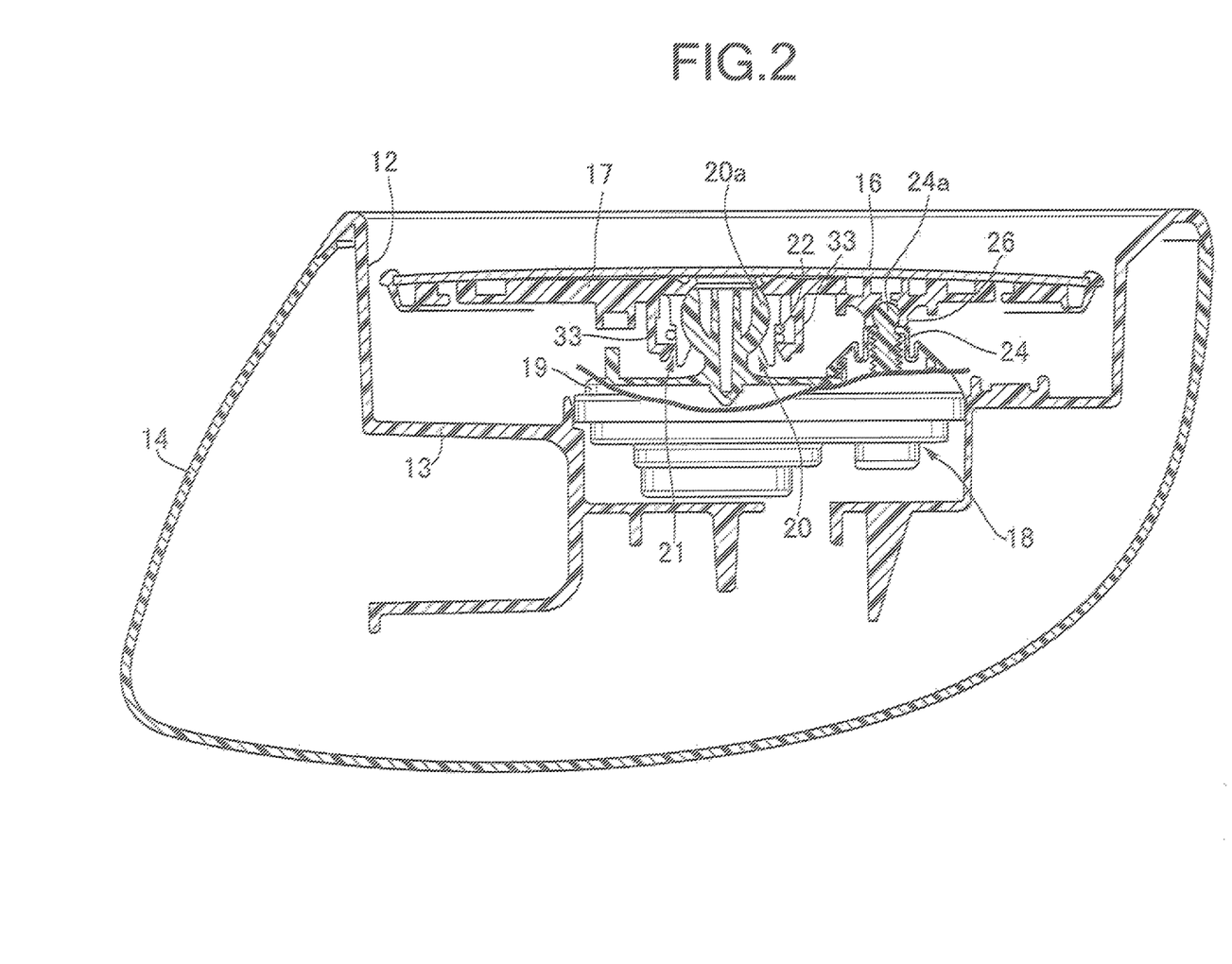
FIG. 2 is a sectional view along line 2-2 in FIG. 1. (first embodiment)

First, in FIG. 1 and FIG. 2, pivotably mounted on a base member 11 mounted on a side door of a four-wheeled passenger vehicle is a housing 13 made of a synthetic resin having a mirror housing recess part 12, and mounted on the housing 13 are a skullcap 14 covering the housing 13 from the side opposite to the mirror housing recess part 12, and a lower housing 15 covering a lower part of the housing 13 from the side opposite to the mirror housing recess part 12 so as to be connected to the lower end of the skullcap 14.

Disposed in an opening of the housing 13, that is, an open end part of the mirror housing recess part 12, are a mirror 16 for viewing the side to the rear of the vehicle and a mirror holder 17 made of a synthetic resin holding the mirror 16.

Figure 3:
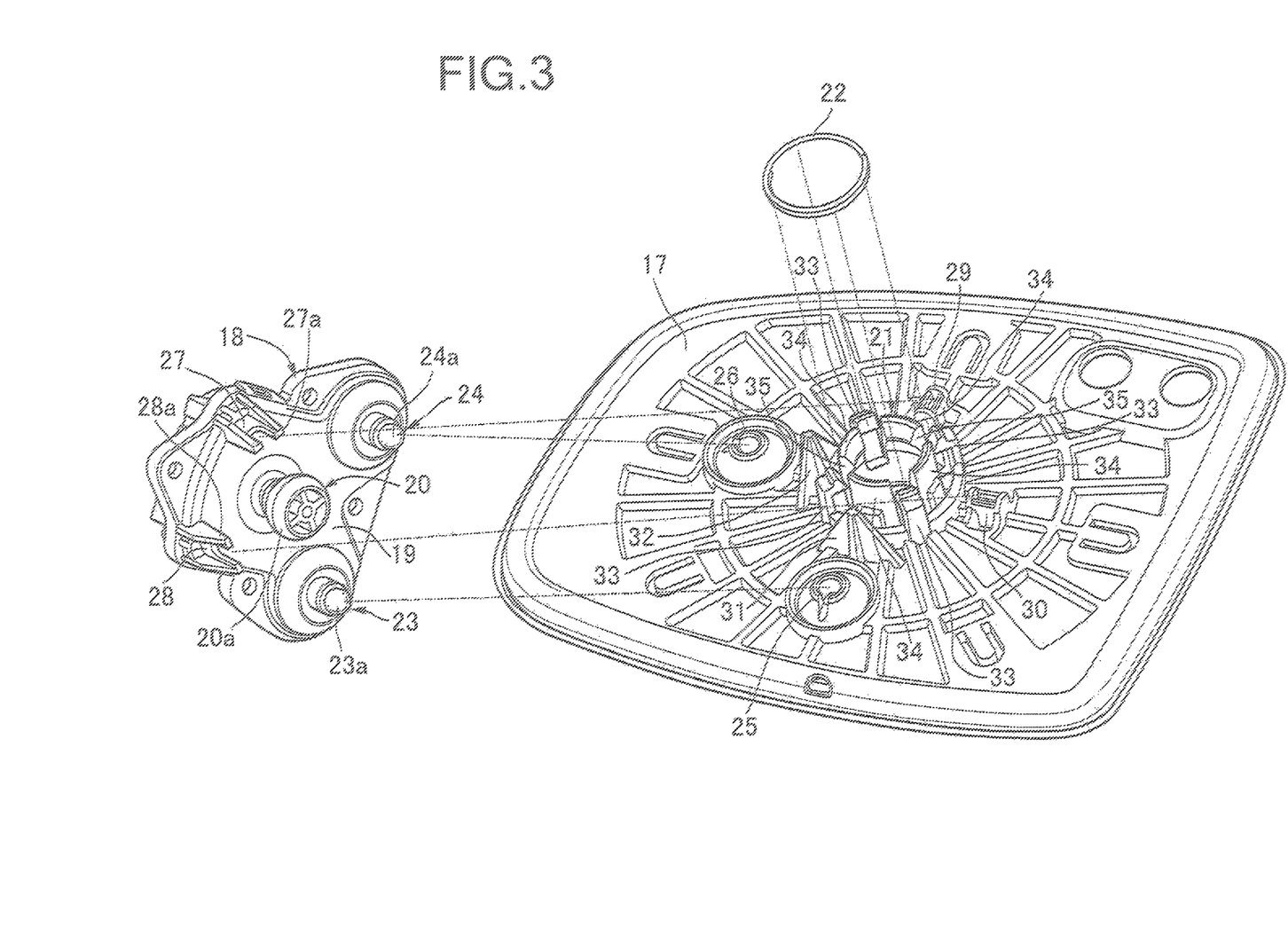
FIG. 3 is an exploded perspective view of a mirror holder, an actuator case and a spring. (first embodiment)
Figure 4:
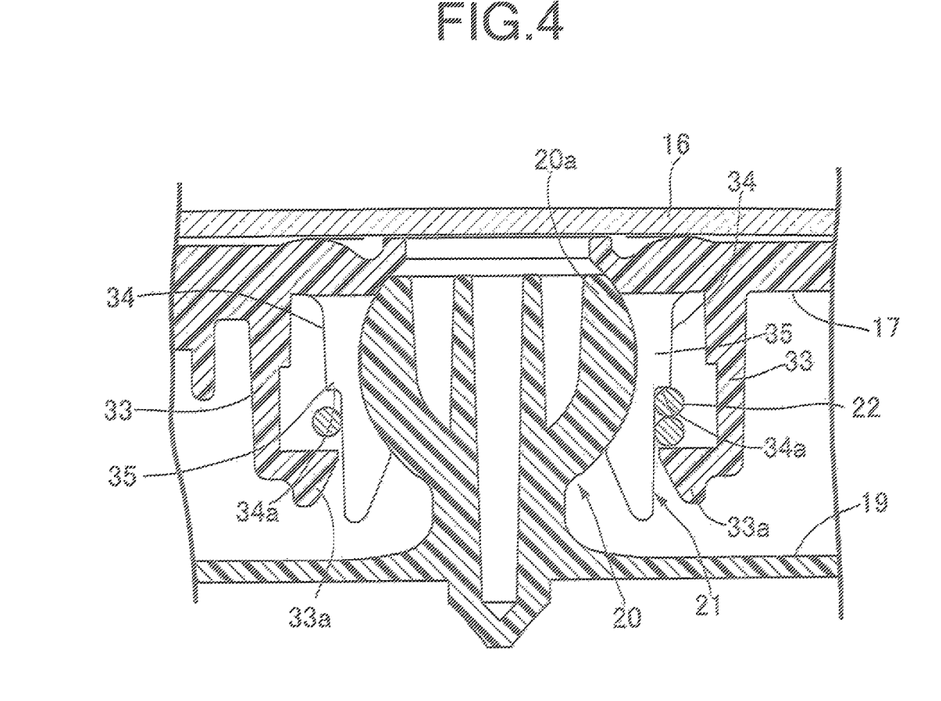
FIG. 4 is an enlarged view of an essential part of FIG. 2. (first embodiment)

Referring in addition to FIG. 3 and FIG. 4, an actuator case 18 housing an actuator (not illustrated) for pivoting the mirror holder 17 is housed and fixed within the housing 13, a case member 19 as a support member forming part of the actuator case 18 is disposed so as to oppose the mirror holder 17, and a joint 20 having a spherical portion 20a in an extremity part is projectingly provided integrally with the case member 17.

On the other hand, a hollow hemispherical fitting and supporting part 21, into which the spherical portion 20a is fitted, is provided integrally with a face, opposing the case member 19, of the mirror holder 17, and a ring-shaped spring 22 maintaining the fitted state of the spherical portion 20a within the fitting and supporting part 21 is fitted around the outer periphery of the fitting and supporting part 21. The mirror holder 17 holding the mirror 16 is thereby swingably supported on the case member 19 of the actuator case 18.

A first drive shaft 23 disposed beneath the joint 20 and a second drive shaft 24 disposed outward of the joint 20 in the vehicle width direction project from the case member 19 of the actuator case 18 toward the mirror holder 17 side. The first and second drive shafts 23 and 24 are driven in the axial direction independently from each other by means of the actuator housed within the actuator case 18, a first spherical head portion 23a provided integrally with one end part of the first drive shaft 23 is swivelably fitted into a first bearing part 25 provided on the mirror holder 17, and a second spherical head portion 24a provided integrally with one end part of the second drive shaft 24 is swivelably fitted into a second bearing part 26 provided on the mirror holder 17.

Back-and-forth movement of the first drive shaft 23 in the axial direction thereby makes the mirror 16 and the mirror holder 17 tilt in the fore-and-aft direction, and back-and-forth movement of the second drive shaft 24 in the axial direction makes the mirror 16 and the mirror holder 17 swing to the left and right in the vehicle width direction.

A first restricting projecting part 27 having a substantially U-shaped first branching portion 27a at an extremity is projectingly provided integrally with an upper part of the case member 19 on the side opposite to the first drive shaft 23 with respect to the joint 20, and a second restricting projecting part 28 having a substantially U-shaped second branching portion 28a at the extremity is projectingly provided integrally with the case member 19 on the side opposite to the second drive shaft 24 with respect to the joint 20, that is, on the inner side in the vehicle width direction. On the other hand, a first restricting engagement part 29 that has the first branching portion 27a at the extremity of the first restricting projecting part 27 engaging therewith is provided on the mirror holder 17 on the side opposite to the first bearing part 25 with respect to the fitting and supporting part 21, and a second restricting engagement part 30 that has the second branching portion 28a at the extremity of the second restricting projecting part 28 engaging therewith is provided on the mirror holder 17 on the side opposite to the second bearing part 26 with respect to the fitting and supporting part 21. The first restricting projecting part 27 and the first restricting engagement part 29 restrict pivoting of the mirror holder 17 around the central axis of the joint 20 of the case member 19 while restricting the rearward tilting end of the mirror holder 17 by abutting against each other when an upper part of the mirror holder 17 moves toward the case member 19 side when the mirror holder 17 tilts rearward. The second restricting projecting part 28 and the second restricting engagement part 30 restrict pivoting of the mirror holder 17 around the central axis of the joint 20 of the case member 19 while restricting the inward tilting end, in the vehicle width direction, of the mirror holder 17 by abutting against each other when an inward part in the vehicle width direction of the mirror holder 17 moves toward the case member 19 side when the mirror holder 17 tilts inward in the vehicle width direction.

A third restricting projecting part 31 projecting toward the case member 19 side is projectingly provided integrally with the mirror holder 17 between the first bearing part 25 and the fitting and supporting part 21, and a fourth restricting projecting part 32 projecting toward the case member 19 side is projectingly provided integrally with the mirror holder 17 between the second bearing part 26 and the fitting and supporting part 21. The third restricting projecting part 31 restricts the forward tilting end of the mirror holder 17 by abutting against the case member 19 when a lower part of the mirror holder 17 moves toward the case member 19 side when the mirror holder 17 tilts forward, and the fourth restricting projecting part 32 restricts the outward tilting end, in the vehicle width direction, of the mirror holder 17 by abutting against the case member 19 when an outward part, in the vehicle width direction, of the mirror holder 17 moves toward the case member 19 side when the mirror holder 17 tilts outward in the vehicle width direction.

The spring 22 is for maintaining the fitted state of the spherical portion 20a in the fitting and supporting part 21, and an engagement part 33 that engages with the spring 22 so as to prevent the spring 22 from disengaging from the fitting and supporting part 21 is formed integrally with the mirror holder 17 at a plurality of locations, for example, four locations, around the fitting and supporting part 21.

The engagement part 33 projects from the mirror holder 17 toward the case member 19 side while having at its extremity an engagement claw 33a projecting toward the fitting and supporting part 21 side, and is formed so that it flexes toward the radially outward direction side of the fitting and supporting part 21 in response to the spring 22 abutting against the engagement claw 33a at the extremity when fitting the spring 22 onto the fitting and supporting part 21 so as to allow the spring 22 to be fitted onto the fitting and supporting part 21.

Furthermore, the fitting and supporting part 21 is formed by annularly aligning a plurality of, for example, four side wall parts 34 having an inner face with an arc-shaped vertical section so as to project from the mirror holder 17 while forming slits 35 therebetween, and the four engagement parts 33 are disposed outside the fitting and supporting part 21 at positions corresponding to the four slits 35 of the fitting and supporting part 21. Moreover, a step portion 34a receiving the spring 22 is formed on an intermediate part of an outside face of each side wall part 34.

Figure 5:
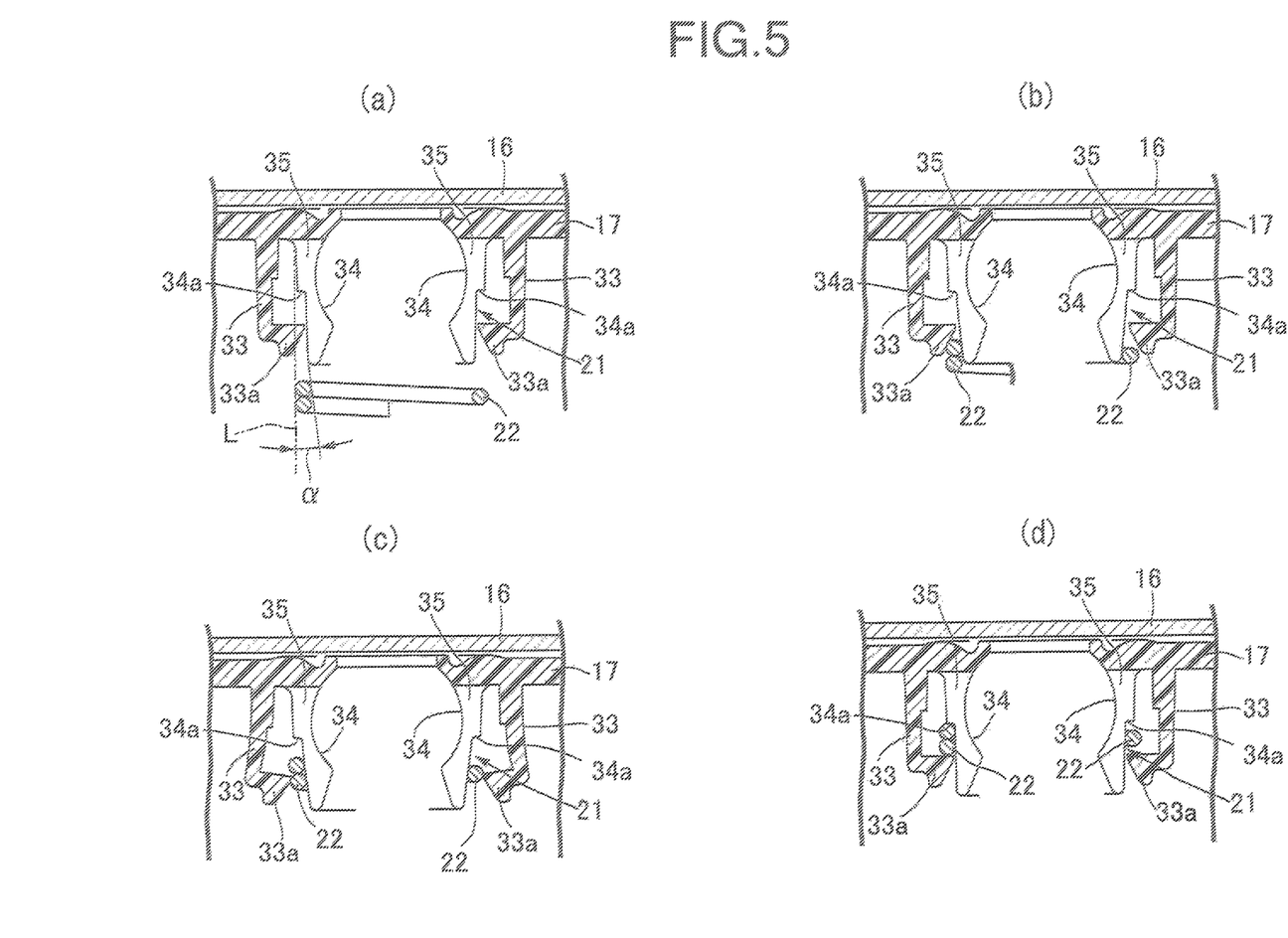
FIG. 5 is a sectional view showing the order of the processes for assembling the spring to a fitting and supporting part. (first embodiment)

The procedure for fitting the spring 22 onto the outer periphery of the fitting and supporting part 21 is explained by reference to FIGS. 5 (a) to (d); the ring-shaped spring 22 in the state shown in FIG. 5 (a) is fitted onto the extremity of the fitting and supporting part 21 as shown in FIG. 5 (b). As shown in FIG. 5 (a), the side wall part 34 of the fitting and supporting part 21 is formed in an inclined manner so that it is positioned further inward in going toward the extremity side in the natural state in which the spherical portion 20a is not fitted. That is, the side wall part 34 is formed in an inclined manner so as to form an angle α with respect to a virtual straight line L that is orthogonal to an inner face of the mirror holder 17.

When the spring 22 fitted onto the extremity of the fitting and supporting part 21 is pushed further in as shown in FIG. 5 (b), as shown in FIG. 5 (c) the spring 22 pushes away the engagement claw 33a at the extremity of the engagement part 33 and progresses while flexing the engagement part 33 outwardly, and as shown in FIG. 5 (d) fitting of the spring 33 onto the outer periphery of the fitting and supporting part 21 is completed by pushing it until it abuts against the step portion 34a of each side wall part 34.

The operation of this embodiment is now explained; the joint 20 having the spherical portion 20a in an extremity part is projectingly provided on the case member 19 housed and fixed within the housing 13, the hollow hemispherical fitting and supporting part 21 having the spherical portion 20a fitted thereinto is provided on the mirror holder 17 holding the mirror 16, and the ring-shaped spring 22 for maintaining the fitted state of the spherical portion 20a into the fitting and supporting part 21 is fitted around the outer periphery of the fitting and supporting part 21. Since the engagement part 33, which engages with the spring 22 so as to prevent the spring 22 from disengaging from the fitting and supporting part 21, is formed integrally with the mirror holder 17 at a plurality of locations around the fitting and supporting part 21 while being capable of flexing so as to allow the spring 22 to be fitted onto the fitting and supporting part 21, it is unnecessary to forcibly expand the spring 22 when fitting the spring 22 around the outer periphery of the fitting and supporting part 21, thus minimizing the assembly load and enhancing the ease of assembly.

Furthermore, since the fitting and supporting part 21 is formed by annularly aligning the plurality of side wall parts 34 having an inner face with an arc-shaped vertical section so that they project from the mirror holder 17 while forming the slits 35 therebetween, when assembling the spring 22 the fitting and supporting part 21 easily flexes in the radially inward direction, thus further enhancing the ease of assembly. Moreover, due to the spherical portion 20a in an extremity part of the joint 20 being fitted thereinto, the fitting and supporting part 21 expands in the radially outward direction, thus strengthening the assembly of the spring 22 with the fitting and supporting part 21 and more reliably preventing the spring 22 from coming off.

Furthermore, since the side wall part 34 is formed in an inclined manner so that it is positioned inward in going toward the extremity side in the natural state in which the spherical portion 20a is not fitted, the operation of fitting the spring 22 onto the fitting and supporting part 21 from the extremity side thereof becomes easy, thus further enhancing the ease of assembly.

An embodiment of the present invention is explained above, but the present invention is not limited to the above embodiment and may be modified in a variety of ways as long as the modifications do not depart from the spirit and scope thereof.

For example, in the above embodiment, a case in which the present invention is applied to a door mirror of a four-wheeled automobile in which the mirror 16 can be tilted in the fore-and-aft direction and the left-and-right direction by means of an actuator is explained, but the present invention may be applied to one in which a mirror can be tilted by a manual operation or the present invention may also be applied to a rearview mirror, or a rearview mirror of a two-wheeled motor vehicle.

The invention claimed is:

1. A mirror device for a vehicle comprising:
   a support member which is housed and fixed within a housing supported on a vehicle,
   a mirror disposed in an opening of the housing, the mirror being held by a mirror holder made of a synthetic resin,
   a joint having a spherical portion in an extremity part thereof, the joint being projectingly provided on the support member,
   a hollow hemispherical fitting and supporting part configured to have the spherical portion fitted thereinto, the fitting and supporting part being provided on the mirror holder;
   a ring-shaped spring for maintaining a fitted state in which the spherical portion is fitted within the fitting and supporting part, the spring being fitted around an outer periphery of the fitting and supporting part, and
   an engagement part that engages with the spring so as to prevent the spring from disengaging from the fitting and supporting part is formed integrally with the mirror holder at a plurality of locations around the fitting and supporting part while being capable of flexing so as to allow the spring to be fitted onto the fitting and supporting part;
   wherein the engagement part projects from the mirror holder separately from the fitting and supporting part.

2. The mirror device for a vehicle according to claim 1, wherein the fitting and supporting part includes a plurality of side wall parts having an inner face with an arc-shaped vertical section, and the side wall parts are annularly aligned so that the side wall parts project from the mirror holder while forming slits therebetween.

3. The mirror device for a vehicle according to claim 2, wherein the side wall parts project from the mirror holder in an inclined manner so as to be positioned further inward in going toward an extremity side in a natural state in which the spherical portion is not fitted to the hollow hemispherical fitting and supporting part.

4. The mirror device for a vehicle according to claim 2, wherein a step portion receiving the spring is formed on an intermediate part of an outside face of each side wall part.

5. The mirror device for a vehicle according to claim 4, wherein:
the engagement part projects from the mirror holder toward the support member; and
an engagement claw is formed at an open end of the engagement part so that the engagement claw flexes toward a radially outward direction side of the fitting and supporting part in response to the spring abutting against the engagement claw when fitting the ring-shaped spring onto the fitting and supporting part so as to allow the spring to be fitted onto the fitting and supporting part.

6. The mirror device for a vehicle according to claim 5, wherein the spring is configured to be held between the step portion and the engagement claw such that movement of the spring in a direction substantially perpendicular to the mirror holder is restricted.

7. The mirror device for a vehicle according to claim 1, wherein:
the fitting and supporting part is open toward the support member for receiving the spherical portion when assembling, and
the spring is fitted around the fitting and supporting part from an open side of the fitting and supporting part.

8. The mirror device for a vehicle according to claim 1, wherein the engagement part engages the spring separately from the fitting and support part.

9. The mirror device for a vehicle according to claim 1, wherein the ring-shaped spring is fully circular in shape and is configured to completely surround the fitting and supporting part.

10. The mirror device for a vehicle according to claim 1, wherein:
the engagement part projects from the mirror holder toward the support member; and
an engagement claw is formed at an open end of the engagement part so that the engagement claw flexes toward a radially outward direction side of the fitting and supporting part in response to the spring abutting against the engagement claw when fitting the ring-shaped spring onto the fitting and supporting part so as to allow the spring to be fitted onto the fitting and supporting part.

11. The mirror device for a vehicle according to claim 1, wherein the spring is configured to be disposed between an inside wall of the engagement part and the outer periphery of the fitting and supporting part.

12. A mirror device for a vehicle comprising:
a support member which is housed and fixed within a housing supported on a vehicle,
a mirror disposed in an opening of the housing, the mirror being held by a mirror holder made of a synthetic resin,
a joint having a spherical portion in an extremity part thereof, the joint being projectingly provided on the support member,
a hollow hemispherical fitting and supporting part configured to have the spherical portion fitted thereinto, the fitting and supporting part being provided on the mirror holder;
a ring-shaped spring for maintaining a fitted state in which the spherical portion is fitted within the fitting and supporting part, the spring being fitted around an outer periphery of the fitting and supporting part; and
an engagement part that engages with the spring so as to prevent the spring from disengaging from the fitting and supporting part is formed integrally with the mirror holder at a plurality of locations around the fitting and supporting part while being capable of flexing so as to allow the spring to be fitted onto the fitting and supporting part,
wherein:
the engagement part is spaced from the fitting and supporting part, and
the fitting and supporting part includes a plurality of side wall parts which are spaced from each other in an annular alignment and which are configured to flex radially inward when the spring is fitted onto the fitting and support part.

* * * * *